United States Patent [19]
Valette

[11] 4,445,759
[45] May 1, 1984

[54] INTEGRATED FRESNEL LENS AND ITS PRODUCTION PROCESS

[75] Inventor: Serge Valette, Grenoble, France

[73] Assignee: Commissariat a l'Energie Atomique, Paris, France

[21] Appl. No.: 308,600

[22] Filed: Oct. 5, 1981

[30] Foreign Application Priority Data

Oct. 8, 1980 [FR] France .................. 80 21476

[51] Int. Cl.³ .............................................. G02B 5/174
[52] U.S. Cl. .................. 350/96.12; 350/452; 204/192 N; 156/654
[58] Field of Search ............... 350/96.11, 96.12, 96.13, 350/96.18, 452; 156/625, 628, 654; 204/192 N

[56] References Cited

U.S. PATENT DOCUMENTS

4,367,916  1/1983  Mottier et al. ................. 350/96.12

OTHER PUBLICATIONS

Wei et al., "Large Refractive Index Change Induced by Ion Implantation . . .," *Appl. Phys. Lett.*, vol. 25, No. 6, Sep. 1974, pp. 329-331.
Ashley et al., "Fresnel Lens in a Thin-Film Waveguide," *Appl. Phys. Lett.*, vol. 33, No. 6, Sep. 1978, pp. 490-492.
Chang et al., "Fresnel Lenses in Optical Waveguides," *IEEE J.Q.E.*, vol. QE-16, No. 7, Jul. 1980, pp. 744-754.

*Primary Examiner*—John D. Lee

[57] ABSTRACT

Fresnel lens for integrated optics, wherein it comprises a light guide of effective index $n_{eff}$ incorporating a guiding layer and a number N of regions of length L(r) measured in the direction of the lens axis as a function of the distance r from the lens axis and disposed in the direction perpendicular to the lens axis, while having a refractive index such that to the right of these regions the effective index of the light guide has a value $n'_{eff}$ which differs from $n_{eff}$ in such a way that a light wave propagated to the right of these regions is given a phase displacement $\Delta\phi$ due to the effective index difference $n'_{eff}-n_{eff}$ and making it possible to obtain constructive light interferences at the chosen image point. The invention also relates to a process for producing a Fresnel lens in which the regions are produced by ion implantation.

15 Claims, 8 Drawing Figures

INTEGRATED FRESNEL LENS AND ITS PRODUCTION PROCESS

BACKGROUND OF THE INVENTION

The present invention relates to a Fresnel lens and its production process. This lens is designed to function in integrated optics structures.

Remote data transmission and/or processing methods which have been studied for several years use transmission by light waves in light guides having a planar structure. These methods are called "integrated optics".

A simple light guide generally comprises a substrate with a refractive index $n_s$ covered with a guidance layer having a real refractive index $n_g$, which is generally higher than the refractive index of the substrate. The structure is completed by air, whose refractive index is below the real refractive index of the guidance layer. In the case of such a guide an effective index $n_{eff} = c/v$ is defined in which v represents the propagation speed of the light in the waveguide and c the propagation speed of the light in vacuum.

As the value of the effective index depends on the value of the different indices of the layers constituting the light guide, as well as their thickness, in integrated optics the speed of a light wave can be modified either by varying the index or by varying the thickness of the various layers used.

By transposing phenomena known in conventional optics attempts have been made to construct in the form of integrated components structures equivalent to the conventional structures for permitting the propagation of light. An integrated lens was one of the first components which it was attempted to produce.

The presently known lenses are of the geodesic type and such a lens is shown in FIG. 1.

This lens is constituted by a substrate 2, e.g. of lithium niobate in which, after forming a light guide 4, a depression 6 having a perfectly defined geometry is made. By the very fact that depression 6 is present this lens has a certain number of technical disadvantages.

In addition, the methods used for producing this lens (ultrasonic micropolishing) are not compatible with the production methods of the other components which it is wished to associate with the lens to obtain more or less complex optical systems, such as a spectral analyzer. The main methods used for producing these components are photolithography, chemical etching, etc. In particular it is difficult to position the lens relative to the various associated components. It is also very difficult to prevent defects relative to the edges 8 of the lens of FIG. 1. These defects lead to a significant light diffraction, which is generally prejudicial to the quality of the lens.

The invention therefore relates to an integrated lens and its production process making it possible to obviate these disadvantages. This lens is of the Fresnel type.

A Fresnel lens is governed by the association of two elements, namely a diffracting plane and a particular phase displacement associated with each point of the diffracting plane such that for a point F of the waveguide for which the lens is produced, all the diffracted light beams which converge at this point occur in constructive interferences. Point F constitutes the focus of the lens.

In conventional optics the Fresnel lens shown in perspective view in FIGS. 2a and 2b can be formed by a sequence of rings constituted by portions of meniscus lenses 10, which can either be plano-convex 10a or plano-concave 10b. The portions of the meniscus lenses 10 have a length L(r) dependent on the distance r from the axis 11 of the lens. The phase displacement produced by such structures varies according to the thickness of the material traversed, i.e. the phase displacement is dependent on the length L(r) of the meniscus lens portions.

In general terms if p and p' are distances between the object points and the image we obtain:

$$L(r) = mL_0 - \frac{L_0}{\lambda_0}\left[\sqrt{r^2 + p'^2} - p' + \sqrt{r^2 + p^2} - p\right] \quad (a)$$

if the variation of index $\delta n$ is positive for a convergent lens and if $\delta n$ is negative for a divergent lens, and $$L(r) = mL_0 + \frac{L_0}{\lambda_0}\left[\sqrt{r^2 + p'^2} - p' + \sqrt{r^2 + p^2} - p\right] \quad (b)$$

if the variation of the index $\delta n$ is negative for a convergent lens and if $\delta n$ is positive for a divergent lens.

In the particular case of an object point at infinity p' is equal to the focal distance f of the lens and the formulas become:

$$L(r) = mL_0 - \frac{L_0}{\lambda_0}\left[\sqrt{r^2 + f^2} - f\right]$$

in the first case (FIG. 2a) and $$L(r) = mL_0 + \frac{L_0}{\lambda_0}\left[\sqrt{r^2 + f^2} - f\right]$$

in the second case (FIG. 2b).

In these formulas f represents the focal distance of the lens, $\lambda_0$ the wavelength in the vacuum of the radiation used and m an integer representing the rank of the ring in question. The integer m is increased by one unit on each occasion that L(r) is cancelled out, i.e. on passing from one ring to the next. Rank m can be taken as equal to 1 for r=0, which gives a length $L(r) = L_0$ at the centre.

In both cases the length $L_0$ is taken in such a way that there is a phase displacement of $2\pi$ on the axis of the lens, i.e.

$$2\pi \frac{\delta n L_0}{\lambda} = 2\pi$$

with $\lambda$ the wavelength used.

It should be noted that in these formulas the length L(r) of the portions of the meniscus lenses 10 is defined to within $L_0$, i.e. to within $2\pi$.

BRIEF SUMMARY OF THE INVENTION

The invention relates to a Fresnel lens in integrated optics produced from a light guide in the manner described hereinbefore.

The present invention specifically relates to a Fresnel lens for integrated optics, wherein it comprises a light guide of effective index $n_{eff}$ incorporating a guiding layer and a number N of regions of length L(r) measured in the direction of the lens axis as a function of the distance r from the lens axis and disposed in the direction perpendicular to the lens axis, while having a refractive index such that to the right of these regions the effective index of the light guide has a value $n'_{eff}$ which differs from $n_{eff}$ in such a way that a light wave propagated to the right of these regions is given a phase displacement $\Delta\phi$ due to the effective index difference $n'_{eff}$-$n_{eff}$ and making it possible to obtain constructive light interferences at the chosen image point.

According to a preferred embodiment of the invention the light guide is constituted by lithium niobate.

The invention also relates to a process for the production of such a Fresnel lens.

According to this process in a substrate is produced a light guide of effective index $n_{eff}$ incorporating a guiding layer and wherein in the said substrate is formed a number N of regions of length L(r) measured in the direction of the lens axis as a function of the distance r from the lens axis, being disposed in the direction perpendicular to the lens axis and having a refractive index such that to the right of these regions the effective index of the light guide has a value $n'_{eff}$ which differs from $n_{eff}$ in such a way that a light wave propagated to the right of these regions is given a phase displacement $\Delta\phi$ due to the effective index difference $n'_{eff}$-$n_{eff}$ making it possible to obtain constructive light interferences at the chosen image point.

It is obviously possible to use all means permitting the production of N regions and according to a preferred embodiment of this production process they are produced by ion implantation, the ions being preferably helium or boron ions.

It is known that ion implantation in a lithium niobate substrate produces a significant drop in the refractive index thereof. This reduction in the refractive index by ion implantation is described in detail in a paper read on Sept. 26th 1978 at the U.S.M. in Grenoble and the I.N.P.G. by Mr. Destefanis entitled "Study of the modification of optical properties induced by ion implantation in lithium niobate. Application to the production of waveguides".

This process for the production of a Fresnel lens for integrated optics permits a precise definition of the index changes which it is desired to obtain. This is very important in the case of an integrated Fresnel lens because the extreme edges of such a lens can be at a distance from one another which is 1$\mu$ or less.

The use of ion implantation makes it possible to significantly modify the refractive indices and consequently produce integrated Fresnel lenses in the lithium niobate having implanted regions of low maximum length $L_0$ making it possible in this way to approach the ideal lens.

In addition, this production process is easy to perform and has a perfect reproducibility.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
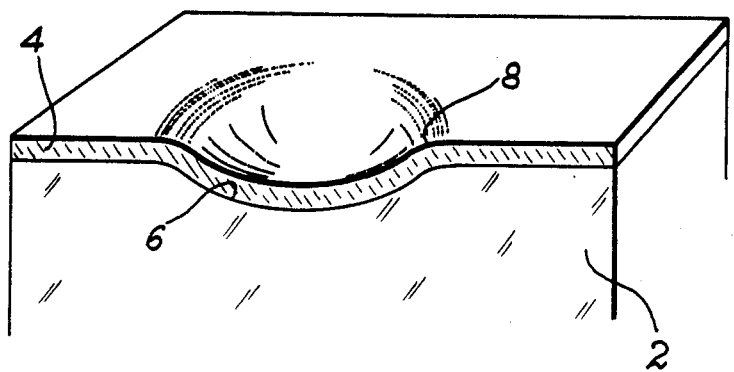
FIG. 1 already described, diagrammatically a prior art integrated optics lens.
Figures 2A, 2B:
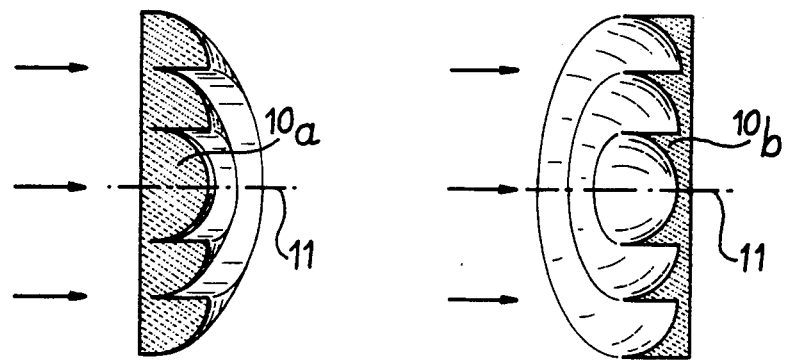
FIGS. 2a and 2b already described, diagrammatically and in perspective form a conventional optics Fresnel lens.
Figure 3:
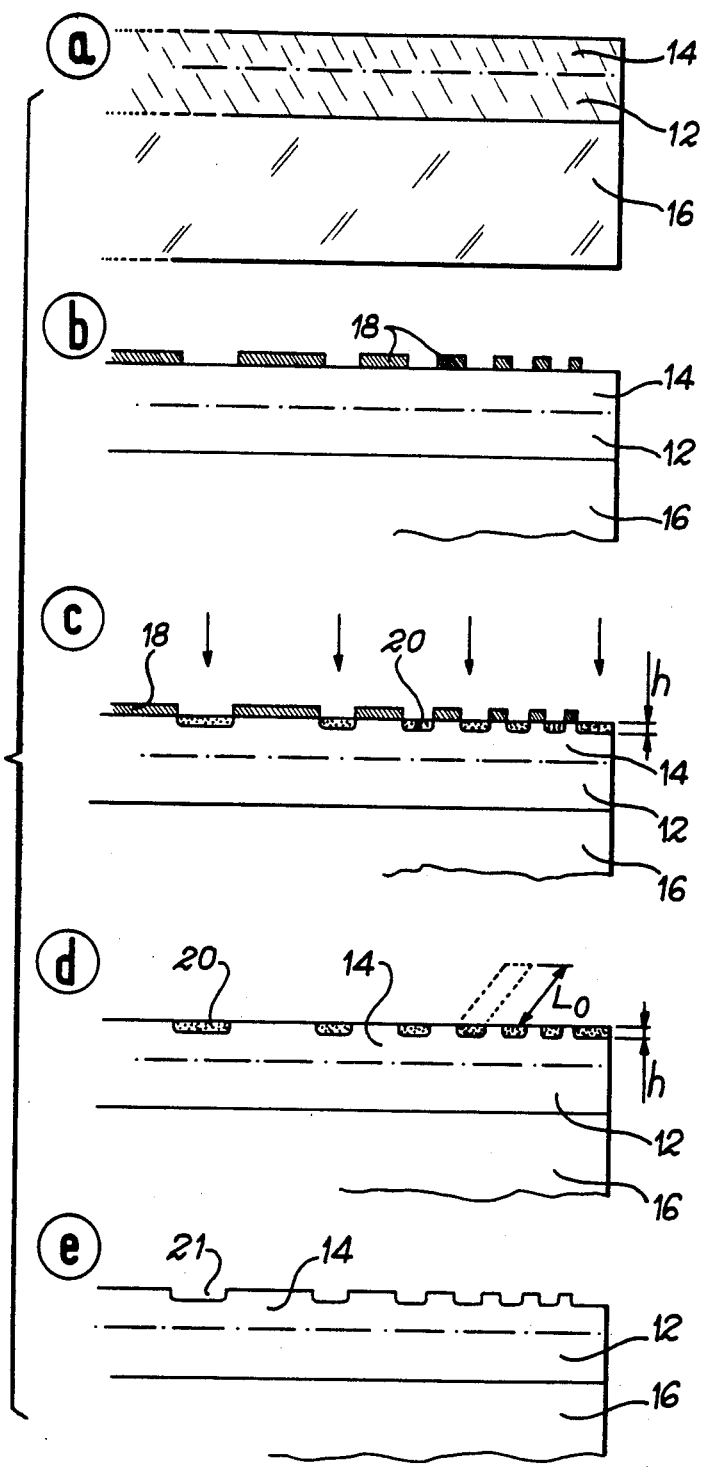
FIG. 3 diagrammatically the process for producing a Fresnel lens according to the invention.

FIG. 3 shows a process for the production of a Fresnel lens according to the invention. The first stage (FIG. 3a) consists of producing a light guide in a preferably lithium niobate substrate. This guide can be produced either by diffusion (of titanium or some other metal, e.g. nickel) or by high energy ion implantation.

Production of the light guide in a lithium niobate substrate by ion implantation involves bringing about a reduction of the refractive index of the substrate in a buried zone 12. The latter is then sandwiched between two layers 14 and 16, with a higher refractive index than zone 12.

In a substrate in which ion implantation leads to a reduction of the index thereof, it is necessary to produce a buried zone 12 in such a way that the guidance layer 14 is sandwiched between zone or layer 12 forming the substrate and air, both of these having a refractive index below the real refractive index of the guidance layer 14.

Conversely in a substrate in which ion implantation leads to an increase in the refractive index such as in silica, the light guide is produced by bringing about an increase in the refractive index of the substrate in a surface zone 12 in such a way that the guidance layer 14 is sandwiched between substrate 16 and air, both having refractive indices lower than the real refractive index of the guidance layer.

Ion implantation in a lithium niobate substrate makes it possible to bring about a significant reduction to the ordinary and extraordinary refractive index. Obviously the index variation is dependent on the implanted ion dose (number of ions implanted per square centimeter).

Figure 4:
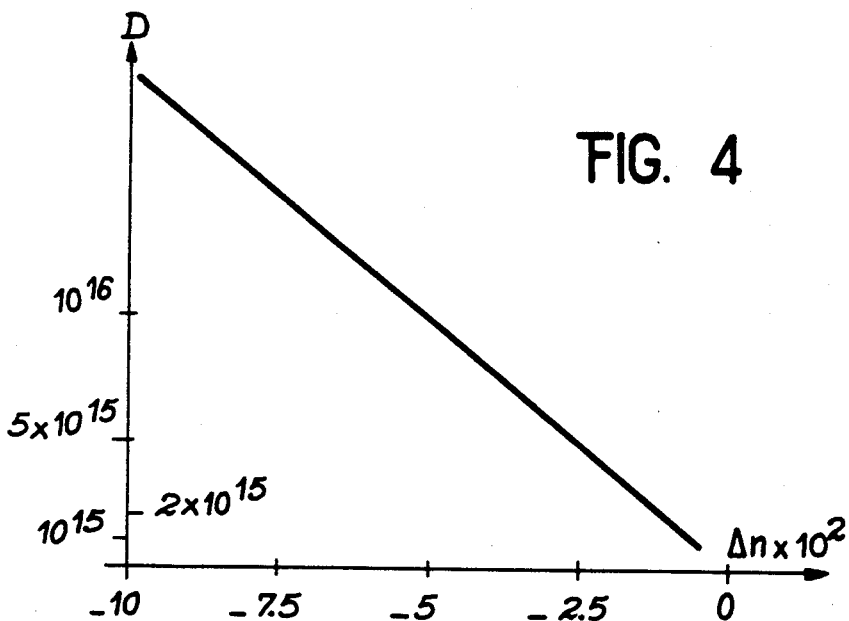
FIG. 4 diagrammatically the variations of the ordinary refractive index ($\Delta_{no}$) as a function of the dose of helium ions implanted per square centimeter (D) in a lithium niobate substrate.

The curve of FIG. 4 indicates the variations of the ordinary refractive index ($\Delta_{no}$) of lithium niobate as a function of the dose (D), expressed in ions per $cm^2$, of helium ions implanted therein, said implantation taking place at ambient temperature. For example for a dose of $5.10^{15}$ ions per $cm^2$ there is a $\Delta_{no}$ of approximately $-2.5 \times 10^{+2}$, which represents a significant reduction to the refractive index.

When the light guide has a buried layer 12 the height of the latter must be sufficient. Thus, in the said buried layer light is propagated in the form of an evanescent wave whose exponential decay is a function of the penetration depth of said wave in said buried layer. To prevent light losses via this evanescent wave it is necessary for layer 12 to be thicker than the penetration depth of said wave therein.

In the case of a lithium niobate substrate in section Z an implantation of $5.10^{15}$ $cm^2$ of helium ions with an energy between 400 keV and 2 MeV produces a 1.2 $\mu$m thick light guide insulated from the substrate by a thickness of 1.8 $\mu$m. This structure given in exemplified manner is monomodal at the wavelength 0.6328 $\mu$m.

After producing the light guide a protective mask 18 constituted by a layer etched in accordance with the geometry which it is desired to obtain is deposited on layer 14 (FIG. 3b). The masking layer 18 can be formed either by a photosensitive resin or by gold, or by aluminum, etc.

The following stage (FIG. 3c) of the process according to the invention consists of implanting ions through the protective mask 18 either on the surface of the light guide as indicated in FIG. 3c, or in a slightly buried zone. The ion implantation depth in the guidance layer 14 is dependent on the energy supplied to the substrate by the beams of ions to be implanted.

In the case of implantation in a lithium niobate substrate the thus produced regions 20 have, as hereinbefore, a refractive index which is below the real refractive index of the layer 14.

The implanted ions are, for example, helium or boron ions. As hereinbefore the index variation in guidance layer 14 is dependent on the implanted ion dose (FIG. 4). Consequently for the same implanted helium ion dose the refractive index of the regions 20 is equal to the refractive index of the layer 12. Obviously this only constitutes an example.

FIG. 3d represents the following stage of the process. This stage consists of removing the protective mask 18, e.g. by chemical etching. Thus, FIG. 3d shows in section a Fresnel lens according to the invention. The p implanted regions 20 have in section the shape of rectangles of height h and whose length L(r) is located parallel to the lens axis.

These regions 20 having a refractive index below the real refractive index of layer 14 make it possible to modify over the entire length L(r) of said layers the effective index $n_{eff}$ of the light guide. Beneath these regions the effective index assumes a value $n'_{eff}$. A guided light wave which propagates over length L(r) consequently acquires, compared with the phase which it had in the initial structure (without the implanted regions), a phase displacement:

$$\Delta \rho = \frac{2\pi \delta n_{eff} L(r)}{\lambda_0}$$

in which $\delta n_{eff} = n'_{eff} - n_{eff}$ and $\lambda_0$ the wave guide in the vacuum of the light radiation used. This phase displacement $\Delta \phi$ takes account both of the phase displacement caused by the variation of the effective index $\delta n_{eff}$ and the phase displacement caused by the traversed material thickness.

Thus, these regions make it possible to locally modify the phase displacement of a guided wave by changing the structure of the light guide and in this way obtain a Fresnel lens of the phase displaced type.

As stated hereinbefore obtaining an appropriate phase displacement to obtain constructive interferences at the focus of the lens is dependent on the variation of the effective index of the light guide $\delta n_{eff}$ and the length L(r) of the regions 20.

Thus, to obtain constructive interferences at the focus of the lens when using an integrated Fresnel lens the phase displacement $\Delta \phi$ is fixed and this must be equal to $2\pi$, which implies that the length $L_0$ of the said regions is linked with $\delta n_{eff}$ by the expression $\delta n_{eff} L_0 = \lambda_0$.

FIG. 3e, which corresponds to a supplementary stage of the process according to the invention, makes it possible to obtain a Fresnel lens according to a variant in which the regions 20 are in the form of hollows 21. This supplementary stage consists of chemically etching the implanted regions 20. When the light guide is made from lithium niobate this chemical etching is carried out with dilute hydrofluoric acid. The implanted regions 20 in the lithium niobate are in fact sensitized to such chemical etching. This sensitization is also illustrated in the paper of Mr. Destefanis referred to hereinbefore. Obviously such Fresnel lenses can only be obtained if the regions 20 are located on the surface of the light guide, i.e. over a certain depth h of guidance layer 14 and in contact with the surface of said layer. It should be noted that in this variant the variation as a function of h of the effective index of the light guide differs from that obtained in the previously described Fresnel lenses, i.e. those shown in FIG. 3d.

In this embodiment and in that described hereinbefore the variation of the effective index of the light guide is dependent on the height h of the implanted regions 20.

To obtain an appropriate phase displacement it is necessary to accurately check the height h and length L of regions 20, as well as the variation of the ordinary index $\Delta_{no}$.

It is easy to check these different parameters by using ion implantation. Thus, the variation of the index $\Delta_{no}$ is dependent on the implanted ion dose (FIG. 4) and height h is dependent on the energy supplied to the substrate during this implantation. The control of the length L is directly dependent on the mask 18 used. The mask produced by photogravure makes it possible to obtain lengths L with an accuracy exceeding 1 micron.

Figure 5:
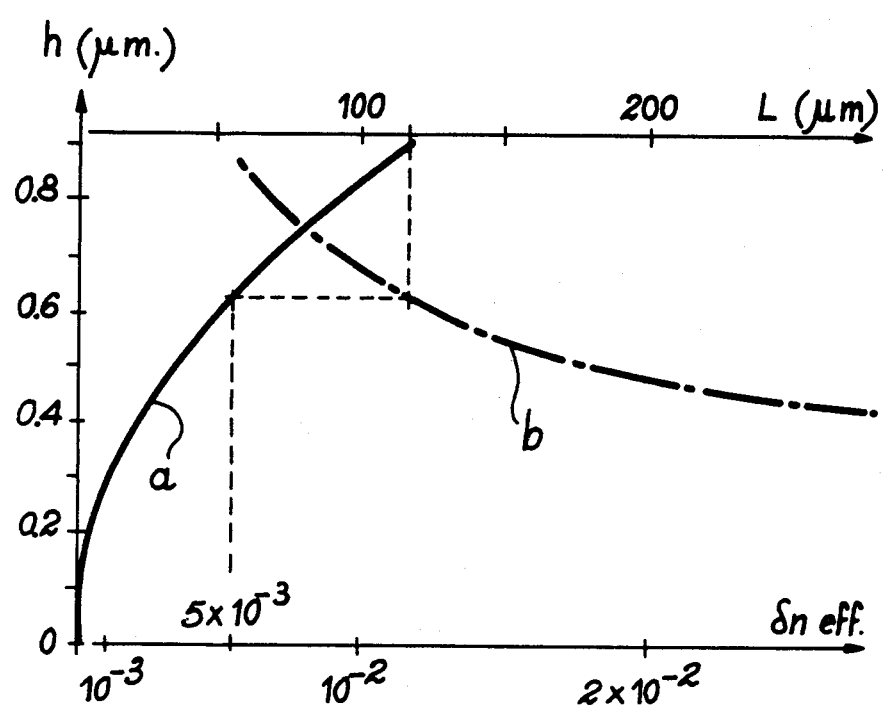
FIG. 5 diagrammatically the variations of the effective refractive index ($\delta n_{eff}$) of lithium niobate as a function of the height of the implanted regions (h) expressed in micrometers (curve a) and the variations of the length (L) of the corresponding regions for obtaining a 2$\pi$ phase displacement (curve b).

It should be noted that the appropriate phase displacement $\Delta \phi$ for obtaining constructive interferences at the focus of the lens is equal to $2\pi$ in the embodiment illustrated in FIG. 5. This $2\pi$ phase displacement corresponds to the embodiment of the Fresnel lenses illustrated in FIG. 6.

These embodiments correspond to an ideal Fresnel lens in which the implanted regions are in the form of portions of meniscus lenses, which are either plano-convex (FIG. 6a) corresponding to the case where $\delta n_{eff}$ is positive, or plano-concave (FIG. 6b) corresponding to the case where $\delta n_{eff}$ is negative and e.g. to the case of ion implantation in lithium niobate.

Figure 6A:
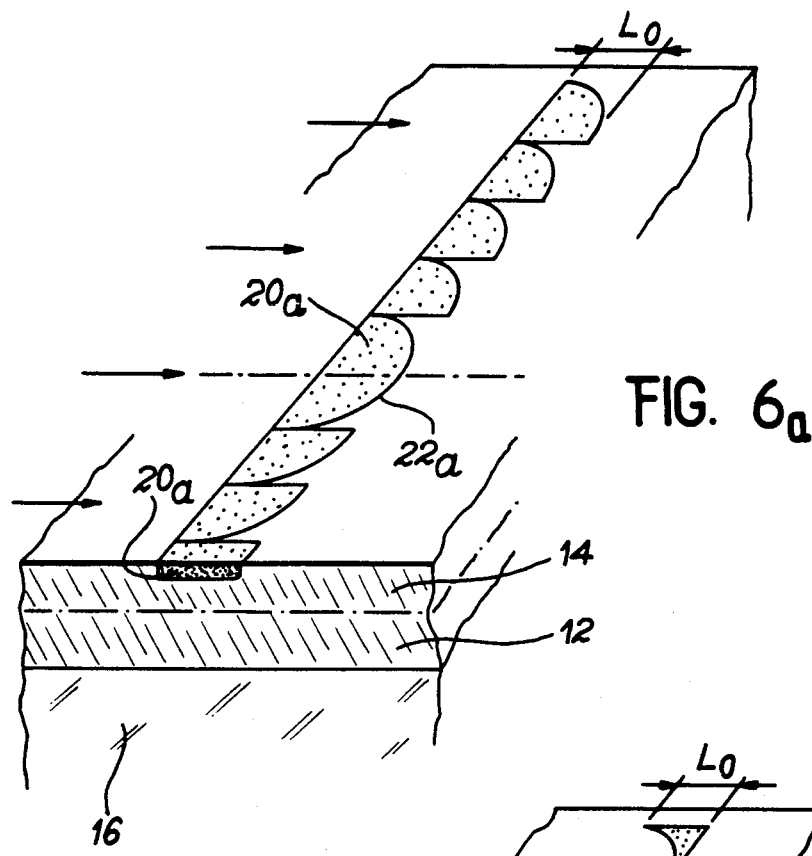
FIGS. 6a and 6b an integrated optics Fresnel lens according to the invention.
Figure 6B:
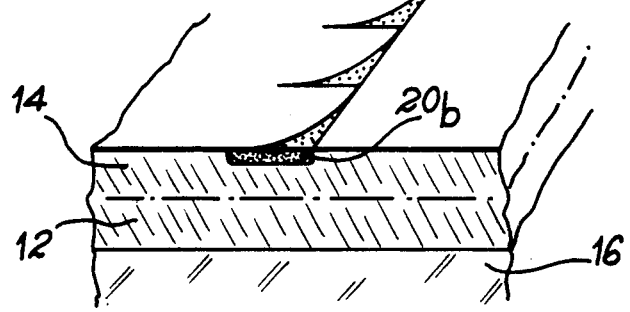

In these embodiments the rear face of regions 20 with the rectangular section of FIG. 3 is a convex face 22a in the manner shown in FIG. 6a and the front face of regions 20 a concave face 22b as shown in FIG. 6b.

The length L of regions 20a and 20b is governed by the formulas of conventional optics Fresnel lenses in which $\delta n$ is replaced by $\delta n_{eff}$. The above-indicated formula (a) corresponds to a convergent lens and to a positive variation of the effective index $\delta n_{eff}$ and the above-indicated formula (b) corresponds to a convergent lens and a negative variation of the effective index $\delta n_{eff}$.

The length L(r) of the regions 20a and 20b is such that there is a phase displacement of $2\pi$ over the axis of the lens giving:

$$\frac{2\pi}{\lambda_0} \delta n_{eff} L_0 = 2\pi$$

The variations of $\delta n_{eff}$ as a function of the height h are shown in FIG. 5. FIG. 5 also shows the variations of length L of said regions corresponding to the phase displacement $\Delta \phi = 2\pi$ which it is wished to obtain.

The curve a shows the variations of the effective index of light guide $\delta n_{eff}$ as a function of the height h expressed in micrometers (μm). The length L which regions 20 must have for a given $\delta n_{eff}$, so as to obtain a phase displacement of the luminous vibrations making it possible to obtain constructive interferences, can be directly calculated from curve b. Through plotting curves a and b on the same graph it is possible to directly link length L with the effective index variation. For example for a $\delta n_{eff}$ of $5 \times 10^{-3}$ we find that L must be equal to 120 μm.

Instead of producing regions 20a and 20b, whose length L(r) strictly corresponds to the relations (a) and (b), it may be adequate to approximately satisfy these, e.g. by carrying out an approximation in steps of curves L(r). A particularly simple embodiment consists of forming parallelepipedic implanted regions with two different lengths, the approximation being at two levels. For example in the arrangement of FIG. 6b a region 20b is replaced by a non-implanted part [L(r)=0] followed by an implanted part of length $L_0/2$ [L(r)=$L_0/2$] or by an implanted part of length $L_0/2$ [L(r)=$L_0/2$] followed by an implanted part of length $L_0$ [L(r)=$L_0$].

In addition, a Fresnel lens according to the invention can be produced on a substrate other than lithium niobate, such as for example a molten silica or quartz substrate.

It should be noted that high dosage implantation for producing the lens according to the invention makes it possible to obtain significant variations of the ordinary index ($\Delta n_o$) and consequently significant variations of $\delta n_{eff}$. This makes is possible to work with limited lengths of regions 20 and to move towards the ideal Fresnel lens, i.e. having no thickness. Conversely the implantation times become prohibitive for an implanted dose exceeding $10^{16}$ ions per cm$^2$ in the case of a lithium niobate substrate. Therefore a compromise is necessary and implanted doses between $10^{15}$ and $10^{16}$ ions/cm$^2$ appear to be completely suitable for producing Fresnel lenses in lithium niobate according to the invention.

It should be noted that the local regions of different refractive index which can be obtained by the invention are not necessarily located on the surface of the guidance layer and can also be located in the depth thereof. They may also be located in one of the two layers defining the guidance layer (deep layer or surface layer).

For realizing the invention it is merely necessary for these regions with a different index to produce in the guidance layer effective index variations making it possible to produce phase displacements corresponding to the Fresnel conditions, either in an accurate or in an approximate manner.

What is claimed is:

1. A Fresnel lens for integrated optics, wherein it comprises a light guide of effective index $n_{eff}$ achieved in a substrate and incorporating a guiding layer and a number N of regions of length L(r) measured in the direction of the lens axis as a function of the distance r from the lens axis and disposed in the direction perpendicular to the lens axis, while having a refractive index such that to the right of these regions the effective index of the light guide has a value $n'_{eff}$ which differs from $n_{eff}$ in such a way that a light wave propagated to the right of these regions is given a phase displacement $\Delta\phi$ due to the effective index difference $n'_{eff}-n_{eff}$ and making it possible to obtain constructive light interferences at the chosen image point.

2. A Fresnel lens according to claim 1, wherein the light guide is made from lithium niobate.

3. A Fresnel lens according to claims 1 or 2, wherein the regions have a concave front face.

4. A Fresnel lens according to claim 3, wherein the regions N have a length L(r) which is dependent on the distance r from the axis of the lens with:

$$L(r) = mL_0 - \frac{L_0}{\lambda_0}\left[\sqrt{r^2 + p'^2} - p' + \sqrt{r^2 + p^2} - p\right]$$

in which p and p' represents the distances between the object and image points, $\lambda_0$ the wavelength in the vacuum of the light wave used, $L_0$ the maximum length and m a positive integer varying successively from 1 to N.

5. A Fresnel lens according to claim 1, wherein the regions have a convex rear face.

6. A Fresnel lens according to claim 5, wherein the regions N have a length L(r) dependent on the distance r from the axis of the lens with:

$$L(r) = mL_0 - \frac{L_0}{\lambda_0}\left[\sqrt{r^2 + p'^2} - p' + \sqrt{r^2 + p^2} - p\right]$$

in which p and p' represent the distances between the object and image points, $\lambda_0$ the wavelength $\lambda$ in the vacuum of the light wave used, $L_0$ the maximum length and m a positive integer varying successively from 1 to N.

7. A Fresnel lens according to claim 1, wherein the length L(r) of the said regions is satisfactory in an approximate manner.

8. A Fresnel lens according to claim 7, wherein the approximation is at two levels.

9. A process for the production of a Fresnel lens according to claim 1, wherein the regions are produced by means of an ion implantation.

10. A production process according to claim 9, wherein the implanted ions are helium ions.

11. A production process according to claim 10, wherein the number of ions implanted per square centimeter of substrate is between $10^{15}$ and $10^{16}$.

12. A production process according to claim 9, wherein the implanted ions are boron ions.

13. A production process according to claim 9, wherein the ions are implanted through a mask deposited on the surface of the light guide.

14. A production process according to claim 9, wherein the regions are chemically etched.

15. A production process according to claim 14, wherein, in the case of a lithium niobate substrate, chemical etching takes place with dilute hydrofluoric acid.

* * * * *